US008621236B2

(12) United States Patent
Servet et al.

(10) Patent No.: US 8,621,236 B2
(45) Date of Patent: Dec. 31, 2013

(54) METHOD FOR ACTIVATING AT LEAST A FUNCTION ON A CHIPSET AND CHIPSET FOR THE IMPLEMENTATION OF THE METHOD

(75) Inventors: Patrick Servet, Cheseaux-sur-Lausanne (CH); Didier Hunacek, Blonay (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 178 days.

(21) Appl. No.: 13/154,159

(22) Filed: Jun. 6, 2011

(65) Prior Publication Data

US 2011/0302427 A1  Dec. 8, 2011

(30) Foreign Application Priority Data

Jun. 4, 2010  (EP) .................................... 10165003

(51) Int. Cl.
*H04L 29/06*  (2006.01)
(52) U.S. Cl.
USPC ............. 713/189; 713/191; 713/168; 726/26; 380/277
(58) Field of Classification Search
USPC .......................................................... 713/189
See application file for complete search history.

(56) References Cited

U.S. PATENT DOCUMENTS

| | | | |
|---|---|---|---|
| 5,410,602 A * | 4/1995 | Finkelstein et al. | 380/281 |
| 5,604,800 A * | 2/1997 | Johnson et al. | 713/189 |
| 5,883,956 A * | 3/1999 | Le et al. | 713/170 |
| 7,389,415 B1 | 6/2008 | Kumar | |
| 2003/0060189 A1 | 3/2003 | Minear et al. | |
| 2003/0097578 A1* | 5/2003 | England et al. | 713/191 |
| 2004/0190558 A1 | 9/2004 | Oliver | |
| 2006/0200412 A1 | 9/2006 | Fahrny et al. | |
| 2006/0281440 A1 | 12/2006 | Minear et al. | |
| 2009/0210695 A1* | 8/2009 | Shahindoust et al. | 713/150 |

FOREIGN PATENT DOCUMENTS

WO  WO 2006/091304  8/2006

OTHER PUBLICATIONS

European Search Report issued in EP 10 16 5003, dated Nov. 5, 2010.

* cited by examiner

*Primary Examiner* — Yogesh Paliwal
(74) *Attorney, Agent, or Firm* — DLA Piper LLP US

(57) ABSTRACT

A method for activating a function of a chipset comprising at least a memory and a calculation module in charge of cryptographic operations, the memory containing at least a seed and the calculation module containing at least one cryptographic algorithm, the method comprising the steps of: receiving at least one of a segmentation key, a global key and a global cryptographic algorithm selector; transmitting at least two items selected from the group consisting of the seed, the received segmentation key, the global key and the global cryptographic algorithm selector, to the calculation module, each of the items being provided by different entities; generating in the calculation module, a temporary key by using one of said at least one cryptographic algorithm of the calculation module and at least the two items; and verifying an authenticity of a received activation message using the temporary key and controlling activation based on the verification.

10 Claims, 2 Drawing Sheets

METHOD FOR ACTIVATING AT LEAST A FUNCTION ON A CHIPSET AND CHIPSET FOR THE IMPLEMENTATION OF THE METHOD

CROSS REFERENCE TO RELATED APPLICATIONS

This application claims priority under 35 U.S.C. Section. 119 to European application No. 10165003.4, entitled "METHOD FOR ACTIVATING AT LEAST A FUNCTION ON A CHIPSET AND CHIPSET FOR THE IMPLEMENTATION OF THE METHOD" filed Jun. 4, 2010, the contents of which are hereby incorporated by reference herein.

TECHNICAL FIELD

The present invention concerns a method for activating at least a function of a chipset comprising at least a memory and a calculation module in charge of cryptographic operations. The function to be activated could be software or/and hardware. For example, such a function could be the activation of a cryptographic operation or hardware blocks of the chipset (like the video decoder or/and transport stream descrambler.) The present invention further concerns a secure chipset implementing the method of the invention.

This chipset can for example be used in user units intended to enable access to conditional access data such as pay-TV content. It can be used essentially in any device wherein the security of the chipset is an important issue.

BACKGROUND ART

A chipset as used in the present invention is a set of electronic circuitry allowing a processor to manage data exchanges between different components of a device or a user unit. The execution of operations at the chipset level aims to prevent all material attack consisting in analyzing the exchanged signals in order to discover the keys specific to the device or user unit. Thereby, the chipset key is not accessible outside the chipset.

In some of the existing secure chipsets, a unique key is introduced in the chipset during manufacturing. The chipset key can be stored in a chipset memory and can be hard coded so that it is not possible to modify this key fraudulently. Additional keys can also be calculated from such a chipset key so that, on the one hand, the hard coded chipset key cannot be modified and on the other hand, different keys could be obtained by modifying the calculation of the key. The calculation of the key could be done by a concatenation, an encryption or any other combination of the chipset key and a number that can be random or not.

All the keys that are introduced later in the chipset or in the device depend one way or another from this initial chipset key. As an example in the field of conditional access TV, the rights that are used to control the access to an encrypted content are encrypted by a decoder key pertaining to this decoder. This decoder key is sent to the concerned decoder encrypted by the initial chipset key. Thus, if the initial chipset key is compromised, the decoder key is also compromised, as well as the content itself.

This initial chipset key cannot be changed during the lifetime of the chipset. Thus, it is important that the chipset key be introduced in a perfectly secure environment. If this chipset key is not introduced under strict security conditions, the security of the chipset and of the user unit cannot be, guaranteed. As the chipset key cannot be changed, if the chipset key is not perfectly secure, it is not possible to enhance the security afterwards.

The initial key is usually introduced at the manufacturing of the chipset or at least has to be known from the manufacturer. However, this key should be activated if specific conditions are fulfilled in particular with regard to the configuration of the chipset. In practice, immediately after the manufacturing of the chipset or during its manufacturing, configuration tests must be passed by the chipset to check if the configuration corresponds to specific requirements, in particular requirements related to security issues. These configuration tests are carried out by the chipset manufacturer which is the only one who can control them. It is thus possible that the initial key is activated although not all the configuration tests were successful. Failure to comply with all the requirements can be made fraudulently or by mistake and can lead to security breaches. In any case, there is no solution for preventing such an incorrect activation of the key if all tests were not passed. In such a case, the security of the user unit cannot be guaranteed.

In the secure chipsets of the prior art, as the configuration tests can be carried out only by the chipset manufacturer, either the tests are passed and specific functions are activated or the tests are not passed and the corresponding functions are not activated. It is not possible to add new features once the manufacturing process is completed.

The U.S. Pat. No. 5,883,956 describes a secure processing unit (SPU) in which functions can be dynamically configured after the chipset has been installed in a device, said device being at a user's premises. A trusted authority reconfigures the secure processing unit, using a capability table and a digital signature. Said capability table is formed in a headend and is hashed to obtain a message digest. The message digest is encrypted with the private key of the secure processing unit to obtain a signature. The capability table and the digital signature are sent to the intended secure processing unit. In the SPU, the message digest is decrypted with the trusted authority public key.

In this secure device, a private key is required to exchange data between the headend and the secure processing unit. This private key is either introduced in the SPU during the manufacturing or derived from a key that is introduced during the manufacturing. Therefore, if the private key or the key that is derived from that private key is compromised, the rights may also be compromised.

Thus, the solution described in U.S. Pat. No. 5,883,956 provides means for adding or removing rights or functions on a chipset, but the security of the operations on the chipset depends on the security of the initial key. This initial key is set by one entity, usually the manufacturer of the chipset, who can set the key even if all the requirements are not fulfilled. As only one entity sets the key from which all the other keys derive, no other entity can check and confirm that all the requirements are fulfilled.

The publication WO 2006/091304 concerns a system and a method for preparing and transmitting to at least one chipset, keys or rights depending on both a geographic region and a time zone. Said method is used to provide blackout functions. These keys or rights depend on an initial key contained in the concerned chipset. Thus, if the initial key is compromised, the security of the whole chipset is also compromised.

DISCLOSURE OF THE INVENTIONS

One object of the invention is to provide a secure chipset in which it is possible to guarantee that all the requirements are fulfilled prior to activating the chipset. These requirements usually concern the fact that the chipset has the correct security configuration. An example of such a correct security configuration could impose that the secure boot and the JTAG protection mechanisms are activated.

Another object of the invention is to activate additional functions after the manufacturing steps of the chipset. These additional functions are however activated only when specific conditions are fulfilled.

Still another object of the invention is to provide a possibility to change a chipset key if it appears that this chipset key is compromised.

The objects of the present invention are achieved by a method for activating a function of a chipset comprising at least a memory and a calculation module in charge of cryptographic operations, the memory containing at least a seed and the calculation module containing at least one cryptographic algorithm, this method comprising the steps of:

receiving by said chipset, at least one of a segmentation key (SK), a global key (GK) and a global cryptographic algorithm selector (GCAS);

transmitting by said chipset, at least two of: the seed, the received segmentation key (SK), the global key (GK) and the global cryptographic algorithm selector (GCAS) to the calculation module, said seed, said received segmentation key, said global key and said global cryptographic algorithm selector being provided by at least two different entities;

generating in the calculation module, a temporary key (SK$_{temp}$) by using one of said at least one cryptographic algorithm of the calculation module and at least two elements among the seed (Sd), the segmentation key (SK), the global key (GK) and the global cryptographic algorithm selector (GCAS);

receiving an activation message by the calculation module;

receiving an authentication code of said message by the calculation module (CM), said message authentication code (MAC) being computed using the temporary key (SK$_{temp}$);

verifying the authenticity of said received message by using the message authentication code (MAC) and the temporary key (SK$_{temp}$);

if the received message is authentic, activating a corresponding function (F1, F2, F3) of the chipset;

if the received message is not authentic, denying the activation of said corresponding function of the chipset.

The objects of the invention are also achieved by a chipset comprising at least a memory and a calculation module in charge of cryptographic operations, the memory containing at least a seed and the calculation module containing at least one cryptographic algorithm, this chipset further comprising:

means for receiving at least one of a segmentation key (SK), a global key (GK) and a global cryptographic algorithm selector (GCAS);

means for transmitting at least two of: the seed, the received segmentation key (SK), the global key (GK) and the global cryptographic algorithm selector (GCAS) to the calculation module, said seed, said received segmentation key, said global key and said global cryptographic algorithm selector being provided by at least two different entities;

means for generating in the calculation module, a temporary key (SK$_{temp}$) by using one of said at least one cryptographic algorithm of the calculation module and at least two elements among the seed (Sd), the segmentation key (SK), the global key (GK) and the global cryptographic algorithm selector (GCAS);

means for receiving an activation message by the calculation module;

means for receiving an authentication code of said message by the calculation module (CM), said message authentication code (MAC) being computed using the temporary key (SK$_{temp}$);

means for verifying the authenticity of said received message by using the message authentication code (MAC) and the temporary key (SK$_{temp}$);

means for activating a corresponding function (F1, F2, F3) of the chipset if the received message is authentic; and means for denying the activation of said corresponding function of the chipset if received message is not authentic.

Thank to the method and the device of the invention, one entity, in particular the manufacturer is not able to activate a mandatory feature of the chipset alone. This means that the security of the chipset cannot be compromised by fraudulent behaviour at the manufacturer's side or by errors during the final tests. In some embodiments of the invention, the entities involved in providing pieces of information are the chipset manufacturer, the entity in charge of the personalisation, the manufacturer of the device in which the chipset will be used, typically a decoder manufacturer and the security provider.

The method of the invention further enables the replacement of the chipset key in case said key is compromised. This offers a great flexibility for the use of these chipsets.

It is further possible to provide a chipset which has an inactive mandatory feature which can be activated not at the manufacturing stage as in the prior art, but latter, at a personalisation stage. This enables to double-check the activation requirements, one check being made at the manufacturing and the other at the activation.

The chipset can further have only a few functions or only one function activated after the personalisation. Additional functions can be activated later on, while the chipset is already installed in a device and in use.

BRIEF DESCRIPTION OF DRAWINGS

The present invention and its advantages will be better understood with reference to the enclosed drawings and to a detailed description of a particular embodiment wherein.

BEST MODE FOR CARRYING OUT THE INVENTION

According to the present invention, the chipset CS contains at least a memory and a calculation module CM. During the manufacturing of the chipset, the memory receives a unique identification number (Sd). This identification number may be secret or not.

Figure 1:
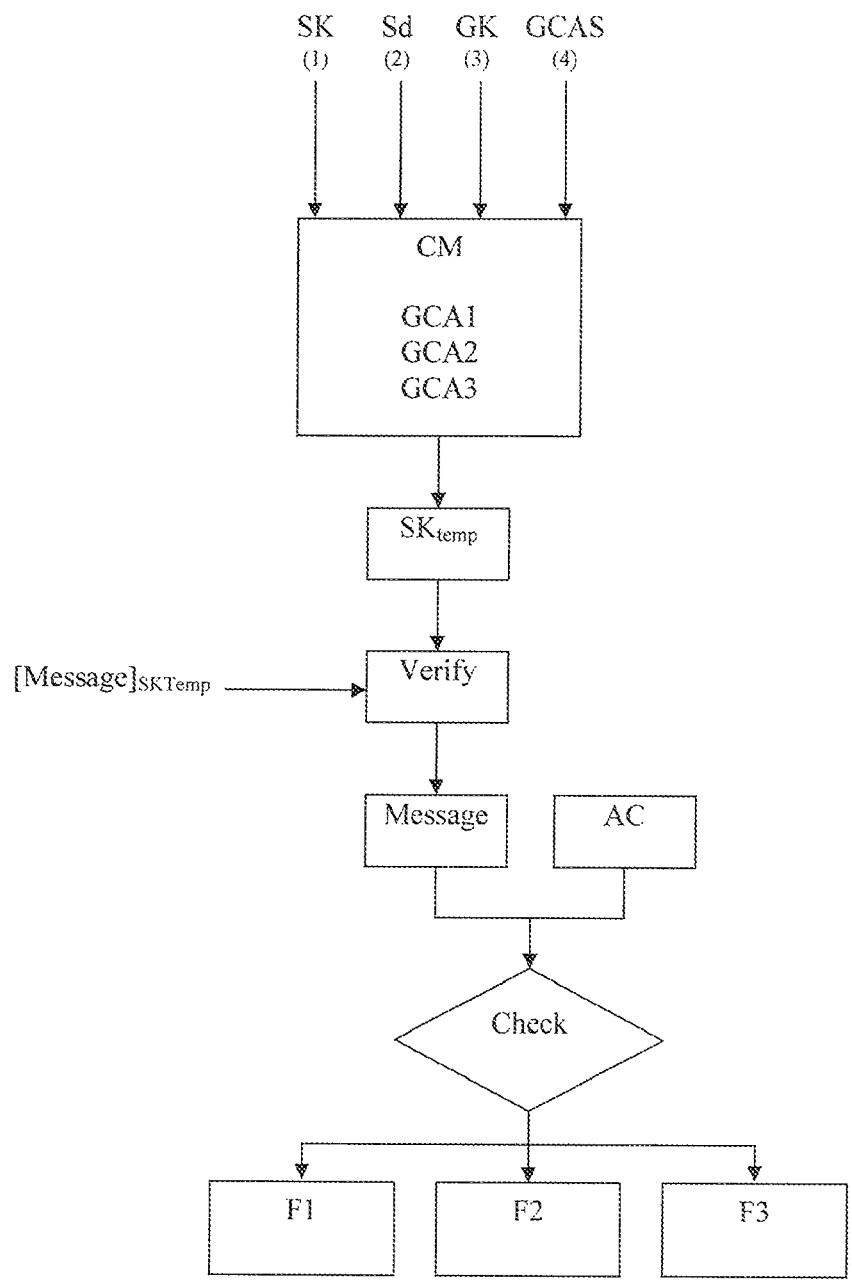
FIG. 1 is a schematic view of the method of the invention.

The calculation module CM of the chipset contains at least one cryptographic algorithm. According to a preferred embodiment, the algorithm is proprietary. However, well-known cryptographic algorithms such as for example 3DES, AES, RSA could also be used. In FIG. 1, the calculation module is illustrated with three algorithms GCA1, GCA2 and GCA3.

After the manufacturing of the chipset, it is personalised, generally by another entity than the manufacturer. During the personalisation, the chipset receives a segmentation key SK. This segmentation key is a key that allows having different temporary keys per user unit model or user unit market for instance. It may further receive at least one of a global key GK or a global cryptographic algorithm selector GCAS. Thus, the chipset comprises at least a unique identification number which may be used as a seed and at least one element among a segmentation key, a global key and a global cryptographic algorithm selector. In some cases where no other unique identification number has been programmed in the chipset at chipset manufacturing time, this seed (Sd) is used for the message addressing. However, in some other cases, another unique identification number is programmed and bound to the seed (Sd) at chipset manufacturing time and therefore this other unique identification number could be used to address the messages. In this invention, the seed could be defined as a unique data per chipset which is programmed at the chipset manufacturing time. While the definition of the global key (GK) is a data programmed afterwards by the decoder manufacturer for instance. It means that if a key is programmed at chipset manufacturing time, it is actually considered as a seed.

At least two elements among the unique identification number, the segmentation key, the global key and the global cryptographic algorithm selector are sent to the cryptographic module CM. In case the global cryptographic algorithm selector is not sent to the cryptographic module, a default algorithm is used. The unique identification number can be used as a seed with one of the other elements sent to the calculation module. The algorithm contained in the cryptographic module is further used to generate a temporary key $SK_{temp}$.

Usually, the seed or unique identification number is known, to the chipset manufacturer. The segmentation key is known to the STB manufacturer and the cryptographic algorithm(s) contained in the calculation module is (are) known to the security provider. Thus, neither the manufacturer nor the personalization entity know all the secrets.

As it can be seen from above, several pieces of information are required to form the temporary key. These pieces of information are spread across several entities, namely the manufacturer, the entity in charge of the personalisation and the security provider. They can only be brought together with great difficulty by ill-intentioned people. This ensures a great security of the device against fraudulent behaviour as well as against errors. Indeed, only the security provider has to know all the information. He will actually obtain this information through reporting.

According to a particular embodiment, a mandatory feature of the chipset is inactive as long as it has not received an activation message. The processing of the activation message requires the use of the temporary key $SK_{temp}$ which was formed as described above. An activation message is formed in a management center for example and is intended to a specific chipset. The message may be encrypted or not. This activation message is associated to a message authentication code, said code being computed using the temporary key which is known to the management center. The computation of the message authentication code with the temporary key may be an encryption or any other appropriate operation using the message authentication code and the temporary key. When the message is received by the chipset, it is processed in order to decrypt it, if necessary, and to retrieve the message authentication code. The message may contain at least two parts. One part concerns the operation that must be performed if some conditions are fulfilled. Another part may contain the conditions AC that must be fulfilled prior to performing the operations. The message can further contain other optional parts.

The message authentication code is computed with the temporary key $SK_{temp}$. This message authentication code is processed in the calculation module in order to obtain the message authentication code in a usable form and the authentication of the message is checked. If the message is authentic, the chipset checks if the conditions AC contained in the message are fulfilled. If this is the case, the operation contained in the message and associated with the list of conditions is performed. According to a specific embodiment, the first function is to activate a mandatory function of the chipset and to render it usable. The temporary key $SK_{temp}$ may be deleted after it is used once.

It is possible that the message contains no condition. In this case, only the result of the authentication of the message decides whether the function is activated or not. If either the authentication fails or the conditions are not fulfilled, the corresponding function is not activated. Other consequences can arise depending on the specific implementation.

During the use of the chipset, it is possible to provide this chipset with additional functions F1, F2, F3. As previously, a message is sent to the chipset, with a message authentication code computed with the temporary key $SK_{temp}$. This message also contains at least an operation and a list of conditions AC. The message authentication code is used to check the authenticity of said message. The conditions are also checked and, if fulfilled, the operation is performed. The operation can be for example the activation of a new function of the chipset.

If the conditions are not fulfilled, at least the activation of the new function is not enabled. Other consequences can also be implemented. For example, if some conditions are not fulfilled, all or a part of the functions of the chipset can be deactivated.

It is possible to send one message for each new function to be activated, with one set of conditions. Different sets of conditions can also be contained in a single message and possibly associated to the same operation or to different operations.

Figure 2:
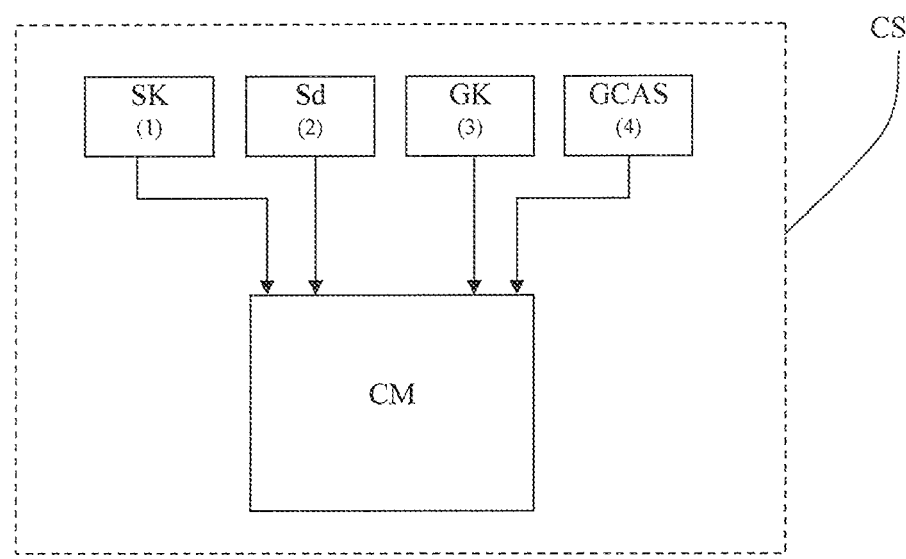
FIG. 2 is a block diagram of part of a system according to an embodiment of the invention.

FIG. 2 illustrates a block diagram of part of a chipset according to an embodiment of the present invention. This chipset comprises a calculation module linked to several devices used to exchange data. These devices can be used to transmit the segmentation key, the seed, the global key and/or cryptographic algorithms to the calculation module. The arrows represent dedicated connections between the devices and the calculation module. The transmission of the data can be made by direct connections through a dedicated bus. The devices are not accessible by any CPU (not shown in FIG. 2, which may be connected to the calculation module by a separate bus, also not shown in FIG. 2).

According to the present invention, it is possible to introduce in a secure way, a key not only when the chipset is manufactured, but also latter on, during a customization process. This offers a greater flexibility and a greater security as the tests can be performed twice and by different entities.

In the chipset of the invention, it is possible to change the chipset key. Thus, if the key is compromised, the chipset can still be used, after having changed the key. This could be actually done during operation of the chipset of course as a counter-measure for instance. This could be achieved by changing the combination of the keys actually used by the calculation module among the ones shown in the FIG. 1 or by selecting another cryptographic algorithm.

According to the method of the invention, the security provider can completely control the process and can in particular ascertain that the configuration of the chipset corresponds to the required features. This offers a greater security against errors as well as against fraudulent manipulations.

It is possible to provide a chipset in which a mandatory function is inactive as long as it has not received an authentic activation message. Such an authentic message is made and sent by a management center which is linked to the security provider. Thus, the chipset must correspond to requirements at the manufacturing stage as well as at the activation stage. As the manufacturing and the activation are usually performed by different entities, the security is enhanced.

The invention claimed is:

1. A method for activating a function of a chipset comprising at least a memory and a calculation module in charge of cryptographic operations, the memory containing at least a seed and the calculation module containing at least one cryptographic algorithm, the method comprising the steps of:
 receiving at least one of a segmentation key, a global key and a global cryptographic algorithm selector;
 transmitting at least two items selected from the group consisting of the seed, the received segmentation key, the global key and the global cryptographic algorithm selector to the calculation module, each of the items being provided by different entities among a chipset manufacturer, an entity in charge of a personalization of the chipset and a security provider;
 generating, in the calculation module, a temporary key by using one of said at least one cryptographic algorithm of the calculation module and at least the two items;
 receiving an activation message by the calculation module;
 receiving an authentication code of said message by the calculation module, said message authentication code being computed using the temporary key;
 verifying the authenticity of said received message by using the message authentication code and the temporary key;
 if the received message is authentic, activating a corresponding function of the chipset; and
 if the received message is not authentic, denying the activation of said corresponding function of the chipset.

2. The method according to claim 1, wherein the activation message further comprises at least one activation condition and in that the method further comprises the step of:
 checking if the at least one activation condition contained in said message is fulfilled;
 if the at least one activation condition is fulfilled, activating said corresponding function of the chipset;
 if at least one of said activation conditions is not fulfilled, denying the activation of said corresponding function of the chipset.

3. The method according to claim 1, wherein the seed is introduced when the chipset is manufactured.

4. The method according to claim 1, wherein the segmentation key is introduced during a step of personalization of the chipset.

5. The method according to claim 1, wherein at least one of said cryptographic algorithm contained in the calculation module is a proprietary algorithm.

6. The method according to claim 1, wherein the calculation module comprises several algorithms and wherein the chipset receives an instruction indicating which algorithm shall be used for generating the temporary key.

7. The method according to claim 1, wherein at least one function of the chipset is inactive until an activation message is received and processed.

8. The method according to claim 1, wherein the temporary key is deleted after it is used once.

9. The method according to claim 1, wherein the activation message is encrypted.

10. A chipset comprising:
 at least a memory and a calculation module in charge of cryptographic operations, the memory containing at least a seed and the calculation module containing at least one cryptographic algorithm, wherein the calculation module is adapted to:
 receive at least two of the seed, a segmentation key, a global key and a global cryptographic algorithm selector, said seed, said received segmentation key, said global key and said global cryptographic algorithm selector being provided by at least two different entities among a chipset manufacturer, an entity in charge of a personalization of the chipset and a security provider;
 generate a temporary key by using one of said at least one cryptographic algorithm of the calculation module and at least two elements among the seed, the segmentation key, the global key and the global cryptographic algorithm selector;
 receive an activation message;
 receive means an authentication code of said message, said message authentication code being computed using the temporary key;
 verify the authenticity of said received message by using the message authentication code and the temporary key;
 activate a corresponding function of the chipset if the received message is authentic; and
 deny the activation of said corresponding function of the chipset if received message is not authentic.

* * * * *